United States Patent [19]

Soicke et al.

[11] Patent Number: 5,607,656
[45] Date of Patent: Mar. 4, 1997

[54] PROCESS FOR PREPARING POTASSIUM PEROXOMONOSULFATE TRIPLE SALT

[75] Inventors: Hartwig Soicke, Overath; Georg Mannebach, Huerth, both of Germany

[73] Assignee: Degussa Aktiengesellschaft, Hanau, Germany

[21] Appl. No.: 597,201

[22] Filed: Feb. 6, 1996

[30] Foreign Application Priority Data

Feb. 7, 1995 [DE] Germany ............ 195 03 900.9

[51] Int. Cl.$^6$ .................................................... C01D 5/00
[52] U.S. Cl. ............................................ 423/513; 423/551
[58] Field of Search ................................ 423/513, 551

[56] References Cited

U.S. PATENT DOCUMENTS

| | | | |
|---|---|---|---|
| 3,041,139 | 6/1962 | D'Addieco | 23/114 |
| 4,610,865 | 9/1986 | Reh et al. | 423/513 |
| 5,139,763 | 8/1992 | Amini | 423/513 |

FOREIGN PATENT DOCUMENTS

| | | | |
|---|---|---|---|
| 0149329 | 7/1985 | European Pat. Off. | 423/513 |
| 3427119A1 | 1/1986 | Germany . | |
| 3813855 | 8/1963 | Japan | 423/513 |
| 979450 | 6/1965 | United Kingdom . | |

*Primary Examiner*—Gary P. Straub
*Assistant Examiner*—Timothy C. Vanoy
*Attorney, Agent, or Firm*—Beveridge, DeGrandi, Weilacher & Young, L.L.P.

[57] ABSTRACT

A process for preparing the potassium peroxomonosulfate triple salt 2 $KHSO_5 \cdot KHSO_4 \cdot K_2SO_4$ by partial neutralization of sulfuric acid-Caro's acid fed to a working solution containing $KHSO_5$, $KHSO_4$ and $K_2SO_4$ with caustic potash solution and evaporation of water. The cold crystallization procedure (15° C. or below) hitherto required is avoided and a high active oxygen yield is produced by using sulfuric acid-Caro's acid with 50 to 70 wt. % of $H_2SO_5$ and 15 to 30 wt. % of $H_2SO_4$ and a working solution with a concentration of 28 to 38 wt. % of $KHSO_5$, 18 to 28 wt. % of $KHSO_4$ and greater than 0 to 3 wt. % of $K_2SO_4$ and supplying additional sulfuric acid, wherein the molar ratio of $H_2SO_5$ to added $H_2SO_4$ to KOH is 3 to 1:3 to 5:8.

13 Claims, 1 Drawing Sheet

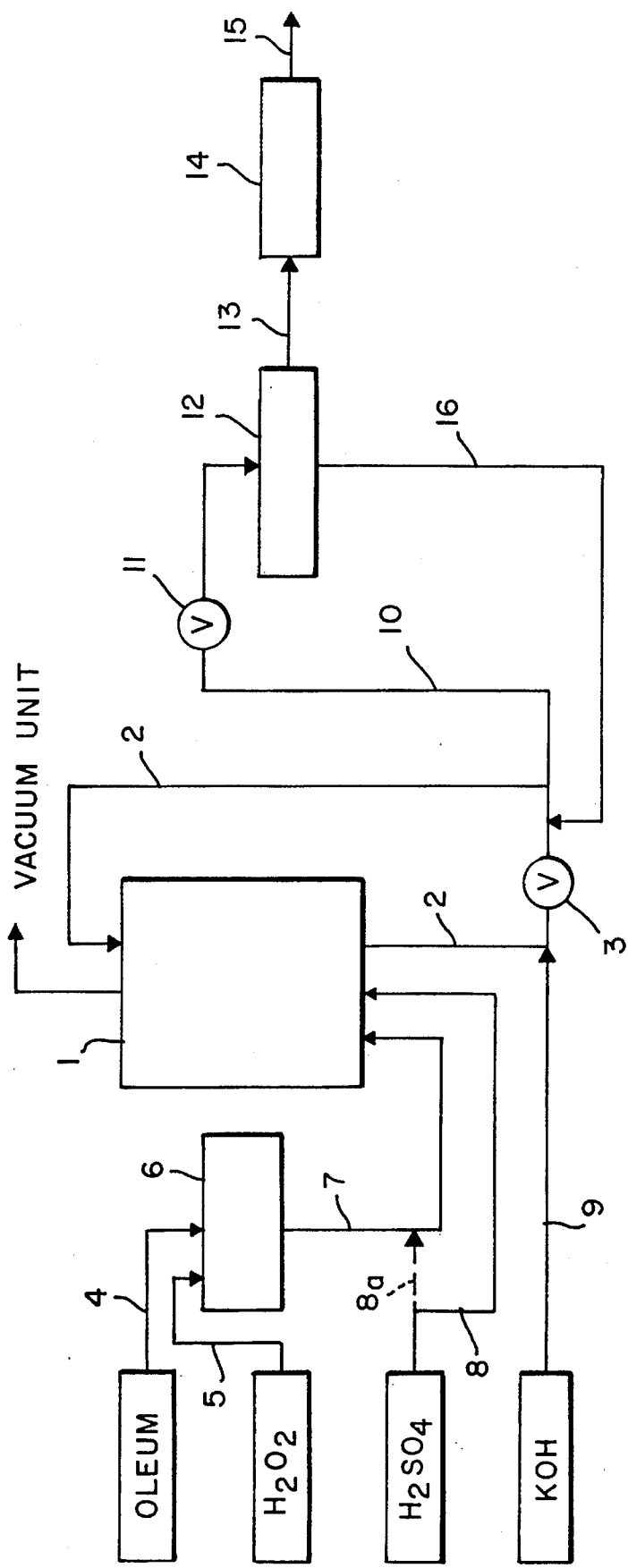

PROCESS FOR PREPARING POTASSIUM PEROXOMONOSULFATE TRIPLE SALT

INTRODUCTION AND BACKGROUND

The present invention relates to a process for preparing the potassium peroxomonosulfate triple salt represented by the formula:

$$2\ KHSO_5 \cdot KHSO_4 \cdot K_2SO_4$$

by partial neutralization of sulfuric acid-Caro's acid fed into an aqueous working solution containing $KHSO_5$, $KHSO_4$ and $K_2SO_4$ using a caustic potash solution with simultaneous evaporation of water.

Due to the high oxidation potential of potassium peroxomonosulfate, the triple salt $2\ KHSO_5 \cdot KHSO_4 \cdot K_2SO_4$ is of industrial importance as a component of bleaches, cleansing agents, detergents, etching agents and as an oxidizing agent in inorganic reactions. The triple salt should be as free as possible of by-products and be sufficiently stable in air. The term "$2\ KHSO_5 \cdot KHSO_4 \cdot K_2SO_4$ triple salt" is also understood to include those products whose composition differs slightly from the molar ratios mentioned. The molar ratio may thus also be in the range 1.8 to 2.1:1 to 0.9:1.1. The concentration of potassium peroxomonosulfate in the triple salt is generally between 45 and 50 mol. %.

Preparation of the $2\ KHSO_5 \cdot KHSO_4 \cdot K_2SO_4$ triple salt is based on the reaction of sulfuric acid or oleum with hydrogen peroxide and partial neutralization of the sulfuric acid-Caro's acid produced thereby with basic potassium compounds such as KOH, $K_2CO_3$ or $KHCO_3$. The triple salt can be recovered from the partially neutralized reaction mixture by evaporating the water. In accordance with U.S. Pat. No. 3,041,139 (which is incorporated by reference in its entirety), preparation takes place in the manner described above. The disadvantage of the process described therein is the cold crystallization procedure required, which is both energy-consuming and also requires additional equipment. A further disadvantage of this known process is the fact that the yield of active oxygen in the isolated triple salt, with reference to the hydrogen peroxide used, is generally between only 50 and 60%. Finally, the triple salt prepared by this method generally contains, as a by-product, about 3 wt. % of potassium peroxodisulfate.

In the process disclosed in GB Patent 979,450, in which the $2\ KHSO_5 \cdot KHSO_4 \cdot K_2SO_4$ triple salt is not mentioned expressis verbis, potassium hydrogen sulfate and/or potassium sulfate are added to the sulfuric acid-Caro's acid or directly to the aqueous hydrogen peroxide solution used for its production in order to promote crystallization of the salt containing $KHSO_5$, $KHSO_4$ and $K_2SO_4$. An increase in yield of up to about 10% is apparently produced by the reaction of $KHSO_4$ with $H_2O_2$. The reaction in this known process is also performed at very low temperatures; moreover, the addition of a solid is required which increases the cost of the process.

DE 34 27 119 (U.S. Pat. No. 4,610,865 which is incorporated by reference in its entirety) discloses a continuous process for preparing the $2\ KHSO_5 \cdot KHSO_4 \cdot K_2SO_4$ triple salt, wherein an aqueous working solution which contains $KHSO_5$, $H_2SO_4$ and $K_2SO_4$ in molar ratios from 1.3 to 2.5:1.2 to 2.0:1 is concentrated in an evaporation unit under reduced pressure and at a temperature of at most 40° C. to give a concentration of 25 to 30 wt. % of $KHSO_5$. The triple salt is precipitated by cold crystallization and, after isolation of the same, the mother liquor is reconstituted by adding sulfuric acid and hydrogen peroxide as well as concentrated KOH and is used as the working solution. This process leads to a product containing very little $K_2S_2O_8$, but in order also to produce a good yield of active oxygen, it is necessary to use expensive, very highly concentrated, preferably 85 wt. % strength, hydrogen peroxide. A further disadvantage is that a cold crystallization stage is also used in addition to the evaporation stage, which requires additional equipment and cooling energy.

SUMMARY OF THE INVENTION

One object of the present invention is to provide a process for preparing the $2\ KHSO_5 \cdot KHSO_4 \cdot K_2SO_4$ triple salt which can be operated batchwise or continuously and which omits the expensive cold crystallization stage.

Another object of the present invention is to produce a high active oxygen yield and a product with as low as possible a concentration of $K_2S_2O_8$, without having to use hydrogen peroxide with a concentration appreciably greater than 70 wt. %.

These and other objects are achieved by a process for preparing the potassium peroxomonopersulfate triple salt $2\ KHSO_5 \cdot KHSO_4 \cdot K_2SO_4$ comprising feeding sulfuric acid-Caro's acid into an initial solution containing $KHSO_5$, $KHSO_4$ and $K_2SO_4$, partially neutralizing the mixture by adding caustic potash solution and simultaneously evaporating water under reduced pressure at a maximum temperature of 40° C. In the process the sulfuric acid-Caro's acid used is one with a concentration of 55 to 70 wt. % of $H_2SO_5$ and 15 to 30 wt. % of $H_2SO_4$ and the initial start up solution is one with a concentration of 28 to 38 wt. % of $KHSO_5$, 18 to 28 wt. % of $KHSO_4$ and more than 0 and up to 3 wt. % of $K_2SO_4$. Additional sulfuric acid is added to the mixture and/or the sulfuric acid-Caro's acid being supplied, wherein the Caro's acid ($H_2SO_5$), added $H_2SO_4$ and KOH being used in the molar ratio of 3 to 1:3 to 5:8 and the triple salt being isolated from the suspension being formed without prior cooling.

When the concentrations and molar ratios according to the invention are maintained, surprisingly the triple salt precipitates from the reaction mixture in high purity during the evaporation stage. Evaporation is expediently performed at 25 to 40° C., preferably at 30° to 40° C. and in particular at about 35° C. The energy input from the neutralization and dilution stages is sufficient to evaporate, under vacuum, the water formed during the neutralization reaction and the water introduced with the reaction components.

BRIEF DESCRIPTION OF THE DRAWINGS

The present invention will be further understood with reference to the drawing, wherein FIG. 1 is a schematic drawing for continuous preparation of the triple salt $2\ KHSO_5 \cdot KHSO_4 \cdot K_2SO_4$.

DETAILED DESCRIPTION OF THE INVENTION

According to a more detailed aspect of the invention, the working solution acting as reaction medium for the partial neutralization of Caro's acid has a different composition from that of the triple salt being prepared. The initial start up or working solution contains potassium peroxomonosulfate in an amount of 28 to 38 wt %, preferably 31 to 36 wt %, potassium hydrogen sulfate in an amount of 18 to 28 wt %, preferably 20 to 25 wt %, and potassium sulfate in an amount of greater than 0 up to 3 wt %, preferably 0.5 to 1.5 wt %. In addition to the components mentioned and water as solvent, the working solution contains by-products introduced with the reaction partners and formed during reaction, such as, in particular, hydrogen peroxide and potassium peroxodisulfate. Since $KHSO_4$ is frequently cited in the literature as a mixture of $H_2SO_4$ and $K_2SO_4$, the composition of the working solution can also be expressed as the molar ratio of $KHSO_5$ to $H_2SO_4$ to $K_2SO_4$. On the basis of the preferred concentration range mentioned above, the molar ratios are in the range of greater than 2 to 3.2: greater than 0.9 to less than 1:1. A particularly preferred molar ratio is in the range 2.5 to 3: greater than 0.9 to less than 1:1. The working solution is the mother liquor obtained after removal of the precipitated triple salt, its composition fundamentally differing from that of the triple salt.

The sulfuric acid-Caro's acid to be used according to the invention can be produced in a way known in the art such as by combining sulfuric acid or oleum with hydrogen peroxide under cooling. In the process according to the invention a Caro's acid is preferably used which has been obtained by reacting 20 to 70 wt. % strength oleum with 30 to 70 wt. % strength aqueous hydrogen peroxide. The reaction partners are preferably combined in a ratio such that the Caro's acid contains 60 to 70 wt. % of $H_2SO_5$ and 18 to 25 wt. % of $H_2SO_4$.

The additional sulfuric acid supplied to the reaction system is expediently used in the form of concentrated sulfuric acid (e.g., 96 wt. %). The additional supply of sulfuric acid shifts the ratio of peroxomonosulfate to sulfate in the total amount of substances being supplied in the direction of the stoichiometry of the triple salt. At the same time, the otherwise normally high degree of degradation of active oxygen is reduced by this measure so that the process according to the invention leads to high yields of active oxygen with reference to the Caro's acid used. When optimizing the amount of added sulfuric acid, the person skilled in the art will take into account both the $H_2SO_4$ content of the sulfuric acid-Caro's acid used and also the sulfuric acid produced by the decomposition of Caro's acid. As concentrated a caustic potash solution as possible is preferably used for partial neutralization, in particular one with a concentration of between 45 and 50 wt. % of KOH.

During addition of the reaction partners to the working solution, water is simultaneously distilled off under reduced pressure. The pressure is adjusted so that a maximum temperature of 40° C. is not exceeded. The pressure is generally less than 5000 Pa, preferably in the range between 2500 and 3500 Pa.

The process according to the invention may be performed in a batchwise manner in a conventional reaction apparatus which has devices for feeding the reaction partners and devices for simultaneous evaporation of water under reduced pressure. Such equipment is known in the art.

A particularly appropriate process flow chart for continuous preparation of the triple salt $2 KHSO_5 \cdot KHSO_4 \cdot K_2SO_4$ is shown in FIG. 1. Partial neutralization and simultaneous evaporation takes place in a vacuum circulation evaporator system including an evaporator 1, circulation piping 2 and circulating pump 3. Oleum and hydrogen peroxide are supplied to reactor 6 via pipes 4 and 5 respectively to form sulfuric acid-Caro's acid, the latter being fed to vacuum evaporator 1 via pipe 7. The additional sulfuric acid being supplied is introduced directly to vacuum evaporator 1 via pipe 8 or via pipes 8a and 7. The caustic potash solution is introduced to circulation piping 2 via pipe 9. A substream of the circulating suspension is supplied to a conventional solid/liquid separating device 12, preferably a centrifuge, via pipe 10 and pump 11. The separated wet salt is supplied to the dryer 14 (suitable dryers are, for example, fluidized bed dryers, turning conveyor dryers, screw-conveyor dryers) via pipe 13 and the dry salt is discharged via pipe 15. The mother liquor is fed to circulation piping 2 via pipe 16. The equipment used is known in the art.

The process according to the invention is characterized in that the $2 KHSO_5 \cdot KHSO_4 \cdot K_2SO_4$ triple salt is obtained in high purity and with high active oxygen yields with reference to the Caro's acid used. In a batchwise version of the process, the yields are surprisingly about and sometimes above 95% (especially above 96%); in a continuous version the yields are unexpectedly about 80%. Surprisingly, the concentration of potassium peroxodisulfate in the isolated triple salt, being generally less than 1.5 wt. %, mostly between 0.1 and 1%, is much lower than the concentration known to be present in current commercial products. Due to the reaction ratios found according to the invention, a cold crystallization procedure (involving low temperatures of 15° C. or below), as was required in previously known processes, is unnecessary and is not used. In other words, crystallization of the triple salt occurs without cooling to 15° C. or below. Due to the reduced amount of apparatus required and the reduced energy demand, the cost of the process is reduced.

The batchwise and continuous methods of operating the process according to the present invention are illustrated by the following examples:

EXAMPLE 1

Batchwise process:

(a) Starting materials:

Raw materials: 65 wt. % strength oleum, 70 wt. % strength aqueous $H_2O_2$ solution, 45 wt. % strength caustic potash solution and 96 wt. % strength $H_2SO_4$.

7.8 l of $H_2O_2$ solution and 10.0 l of oleum were mixed in a coolable reaction vessel at about 10° C. for about 10 min so that a sulfuric acid-Caro's acid with a concentration of 65 wt. % of $H_2SO_5$ was produced, which also contained water and a little $H_2O_2$ and $H_2S_2O_8$.

(b) Triple salt formation: 500 kg of mother liquor with a concentration of 34 wt. % of $KHSO_5$, 22 wt. % of $KHSO_4$ and 1 wt. % of $K_2SO_4$ were introduced into a vacuum evaporator. 110 kg of the solution prepared under (a), 20 kg of sulfuric acid and 177 kg of caustic potash solution were added over about 1 h under a vacuum of 3400 Pa and at about 35° C. About 40 kg of water were evaporated off at the same time. Finally the precipitating triple salt was filtered off and dried.

The filtrate was re-used as working solution in a repeat trial and led to a triple salt of the same quality under the conditions mentioned above.

Product analysis of the moist salt:

47.3% $KHSO_5$ 22.03% $KHSO_4$ 27.03% $K_2SO_4$ 0.1% $K_2S_2O_8$ 3.5% $H_2O$  Molar ratio $KHSO_5:KHSO_4:K_2SO_4=$ 1.92:1:0.96 AO yield with respect to $H_2SO_5=96.7\%$

EXAMPLE 2

Continuous process:

(a) Starting materials:

same as in example 1.

(b) Preparation was performed in accordance with the process scheme shown in FIG. 1. 750 kg of a working solution with a concentration of 34 wt. % of $KHSO_5$, 22 wt. % of $KHSO_4$ and about 1 wt. % of $K_2SO_4$ were circulated round the production circuit (circulating evaporator 1 and circulation piping 2 and pump 3).

To this working solution were added, under vacuum evaporation, 30.2 kg/h of a sulfuric acid-Caro's acid with a concentration of 65 wt. % of $H_2SO_5$ and 21 wt. % of $H_2SO_4$, prepared under cooling in reactor 6, and 5.4 kg/h of $H_2SO_4$ (96 wt. %) and 36.6 kg/h of caustic potash solution (45 wt. %), at 35° C. and at a pressure of 4000 Pa. The working solution was circulated. A substream of the suspension formed (100 kg/h) was withdrawn from circulation and fed to a centrifuge. The triple salt thus isolated was dried. The mother liquor was returned to circulation.

Product analysis:

48.91% $KHSO_5$ 22.43% $KHSO_4$ 25.54% $K_2SO_4$ 0.84% $K_2S_2O_8$

Molar ratio $KHSO_5:KHSO_4:K_2SO_4$ 32 1.95:1:0.91

AO yield with respect to $H_2SO_5=80\%$

Further variations and modifications of the foregoing will be apparent to those skilled in the art and such variations and modifications are intended to be encompassed by the claims that are appended hereto.

German Priority Application 195 03 900.9, filed on 7 Feb. 1995, is relied on and incorporated by reference in its entirety.

We claim the following:

1. A process for preparing potassium peroxomonopersulfate triple salt 2 $KHSO_5 \cdot KHSO_5 \cdot K_2SO_4$, said process comprising feeding (a) caustic potash solution, additional sulfuric acid and sulfuric acid-Caro's acid or (b) caustic potash solution and a mixture of sulfuric acid-Caro's acid and additional sulfuric acid into a working solution containing $KHSO_5$, $KHSO_4$ and $K_2SO_4$ to form a mixture and simultaneously evaporating water under reduced pressure at a maximum temperature of 40° C., and isolating said triple salt wherein crystallization of said triple salt occurs without cooling to 15° C. or below, wherein said sulfuric acid-Caro's acid has a concentration of 55 to 70 wt. % of $H_2SO_5$ and 15 to 30 wt. % of $H_2SO_4$ and said working solution has a concentration of 28 to 38 wt. % of $KHSO_5$, 18 to 28 wt. % of $KHSO_4$ and more than 0 up to 3 wt. % of $K_2SO_4$.

2. The process according to claim 1, wherein said working solution contains 31 to 36 wt. % of $KHSO_5$, 20 to 25 wt. % of $KHSO_4$ and 0.5 to 1.5 wt. % of $K_2SO_4$.

3. The process according to claim 1, further comprising preparing said Caro's acid by reacting 20 to 70 wt. % strength oleum and 30 to 70 wt. % strength hydrogen peroxide to yield 60 to 70 wt. % of $H_2SO_5$ and 18 to 25 wt. % of $H_2SO_4$.

4. The process according to claim 1, wherein said temperature is 25° to 40° C.

5. The process according to claim 4, wherein said temperature is 30° to 35° C.

6. The process according to claim 4, wherein said temperature is about 35° C.

7. The process according to claim 1, wherein said triple salt contains less than 1.5 wt. % $K_2S_2O_8$.

8. The process according to claim 7, wherein said triple salt contains 0.1 to 1 wt. % $K_2S_2O_8$.

9. The process according to claim 1, wherein said pressure is less than 5000 Pa.

10. The process according to claim 9, wherein said pressure is 2500 to 3500 Pa.

11. The process according to claim 1, further comprising continuously supplying said sulfuric-acid Caro's acid, additional sulfuric acid and caustic potash solution to said working solution initially introduced into an evaporator, isolating said triple salt from a withdrawn substream by means of a conventional solid/liquid separating device and returning a filtrate said evaporator as working solution.

12. The process according to claim 1, said process consisting essentially of feeding (a) caustic potash solution, additional sulfuric acid and sulfuric acid-Caro's acid or (b) caustic potash solution and a mixture of sulfuric acid-Caro's acid and additional sulfuric acid into a working solution containing $KHSO_5$, $KHSO_4$ and $K_2SO_4$ to form a mixture and simultaneously evaporating water under reduced pressure at a maximum temperature of 40° C., and isolating said triple salt wherein crystallization of said triple salt occurs without cooling to 15° C. or below, wherein said sulfuric acid-Caro's acid has a concentration of 55 to 70 wt. % of $H_2SO_5$ and 15 to 30 wt. % of $H_2SO_4$ and said working solution has a concentration of 28 to 38 wt. % of $KHSO_5$, 18 to 28 wt. % of $KHSO_4$ and more than 0 up to 3 wt. % of $K_2SO_4$, wherein the Caro's acid, additional $H_2SO_4$ and KOH being used is in a molar ratio of 3 to 1:3 to 5:8.

13. The process according to claim 1, said process consisting of feeding (a) caustic potash solution, additional sulfuric acid and sulfuric acid-Caro's acid or (b) caustic potash solution and a mixture of sulfuric acid-Caro's acid and additional sulfuric acid into a working solution containing $KHSO_5$, $KHSO_4$ and $K_2SO_4$ to form a mixture and simultaneously evaporating water under reduced pressure at a maximum temperature of 40° C., and isolating said triple salt wherein crystallization of said triple salt occurs without cooling to 15° C. or below, wherein said sulfuric acid-Caro's acid has a concentration of 55 to 70 wt. % of $H_2SO_5$ and 15 to 30 wt. % of $H_2SO_4$ and said working solution has a concentration of 28 to 38 wt. % of $KHSO_5$, 18 to 28 wt. % of $KHSO_4$ and more than 0 up to 3 wt. % of $K_2SO_4$, wherein the Caro's acid, additional $H_2SO_4$ and KOH being used is in a molar ratio of 3 to 1:3 to 5:8.

* * * * *